United States Patent [19]

Frost et al.

[11] 4,159,046

[45] Jun. 26, 1979

[54] CHAIN LUBRICATION APPARATUS AND METHOD

[75] Inventors: Charles C. Frost; Siegfried K. Weis, both of Grand Rapids, Mich.

[73] Assignee: C. L. Frost & Son, Inc., Grand Rapids, Mich.

[21] Appl. No.: 828,980

[22] Filed: Aug. 29, 1977

[51] Int. Cl.² .............................................. F16N 7/14
[52] U.S. Cl. ...................................... 184/15 A; 184/35
[58] Field of Search ............... 184/15 R, 15 A, 15 B, 184/27 A, 35

[56] References Cited

U.S. PATENT DOCUMENTS

| 1,502,083 | 7/1924 | Zoelly ................................. 74/467 X |
| 2,998,865 | 9/1961 | Geissler ............................. 184/15 A |
| 3,424,022 | 1/1969 | Greenberg et al. ..................... 74/409 |
| 3,672,468 | 6/1972 | Schuster ............................. 184/15 A |
| 3,762,504 | 10/1973 | Banyas et al. ...................... 184/15 A |
| 4,024,930 | 5/1977 | Thomson et al. ................... 184/15 B |

Primary Examiner—David H. Brown
Attorney, Agent, or Firm—Price, Heneveld, Huizenga & Cooper

[57] ABSTRACT

The specification discloses a chain lubricator having teeth which engage a chain and deliver a predetermined amount of lubricant through an internal passageway to the chain. Also disclosed are an oil reservoir and apparatus for measuring and delivering a metered or predetermined amount of oil from the reservoir through the passageway of one of the teeth when it is engaged with the chain. Preferably, the teeth form part of an idler sprocket engaging the chain.

35 Claims, 8 Drawing Figures

CHAIN LUBRICATION APPARATUS AND METHOD

BACKGROUND OF THE INVENTION

(1) Field of the Invention

This invention relates to chain lubrication; and, more particularly, to a chain lubricator which engages the chain.

(2) Prior Art

Known prior art chain lubricators utilize a cam action to activate a valve which squirts or sprays oil from an oil line directly on the conveyor or chain. For example, a lever or roller can be displaced from an at rest position every time a chain pin of a chain passes. Movement of the lever or roller opens a valve which permits oil to flow through a tube which is pointed at the chain, thus lubricating the chain. The problems encountered with such prior art lubricators include expense, causing excessive oil dripping or the like where it cannot be tolerated such as in food handling industries, and not directing the oil directly on the chain pins where it is most needed.

Other prior art discloses the use of lubricating sprockets engaging conveyor chains. For example, an oil feed line mounted on and movable with such a sprocket engages a nipple on the chain to supply lubricant to the chain. It can be appreciated that there must be relatively good alignment between the oil feed line and the oil receiving nipple. The requirement for such an alignment creates difficulty in installing and operating such a chain lubrication system. That is, often the sprockets must be aligned to engage the chain and the oil feed line aligned to engage the nipple. Further, the use of such prior known oil delivery or feed lines prevents effective lubrication of the critical portions of the chain.

Other prior art discloses the use of sprockets with passageways between the chain-engaging teeth of the sprocket. Such passageways do not direct lubricating oil at the critical chain parts subject to friction wear and do not solve the problem of lubricating the chain. Indeed, directing oil in passageways between the sprocket teeth is offered as a solution for the problem of lubricating the surface of the sprocket-wheel against which the chain bears and not the problem of chain lubrication.

SUMMARY OF THE INVENTION

This invention concerns lubrication of a chain by a tooth which engages the chain and provides lubrication from within a chain. The tooth has internal passageways for providing a lubricant path to the chain pins of the chain.

In accordance with a preferred embodiment of this invention, a tooth for use in a chain lubrication apparatus by engaging a chain and supplying lubricant to the chain is sized to be receivable between the links of the chain. The tooth includes means for attachment to a carrier for moving the tooth into and out of engagement with the chain. Further, the tooth includes means for connecting said tooth to a lubricant insertion apparatus for supplying lubricant to said tooth, and an internal lubricant passageway for passing lubricant from said lubricant insertion apparatus through said tooth.

An embodiment of this invention can also include a lubricant reservoir for storing lubricant for use in repeated lubrication of the chain, a metering means for measuring a predetermined amount of lubricant to be used for one lubrication, and an actuating means for triggering lubricant flow through the tooth when the tooth is engaged with the chain.

A method of lubricating a chain in accordance with an embodiment of this invention includes the step of inserting a tooth of a sprocket wheel in a lubrication position between two adjacent chain pins of the chain thereby registering the tooth with the lubrication position. Further, the method includes applying lubricant to the chain through an internal lubricant passageway in the tooth by directing lubricant upwardly through the passageway and outwardly to exit from the tooth. As a result, lubricant flowing in the passageway is deposited at an upper portion of the chain pin and can flow down the chain pin under the influence of gravity to lubricate the lower portions of the chain pin.

Thus, the invention is particularly advantageous where accurate placement of a predetermined quantity of lubricant is desired. The internal lubricant passageway provides a positive means for delivering oil to the friction areas of the chain and has a construction inherently adaptable for heavy duty use without damage to the lubricator. Advantageously, the chain provides the power for driving and timing the lubricator which, in the preferred embodiment, functions as an idler sprocket during chain movement. Further, even with variations in the speed of movement of the chain, the proper and desired amount of lubrication of the chain is accomplished. A lubrication system in accordance with an embodiment of this invention can also include means for preventing over lubrication if the chain is stopped. That is, only the tooth engaged with the chain dispenses lubricant. The lubricant is dispensed in response to movement of the chain and is not applied to the chain or wasted when chain movement stops.

Accordingly, this invention measures and applies lubricant so that there is no drip. The lubricant is applied to the chain pins from the inside of the chain thus further reducing the possibility of dripping. By applying lubricant where it is most needed, there is substantially no lubrication of non-essential areas and a concurrent reduction in waste of lubricant.

DETAILED DESCRIPTION

Figure 1:
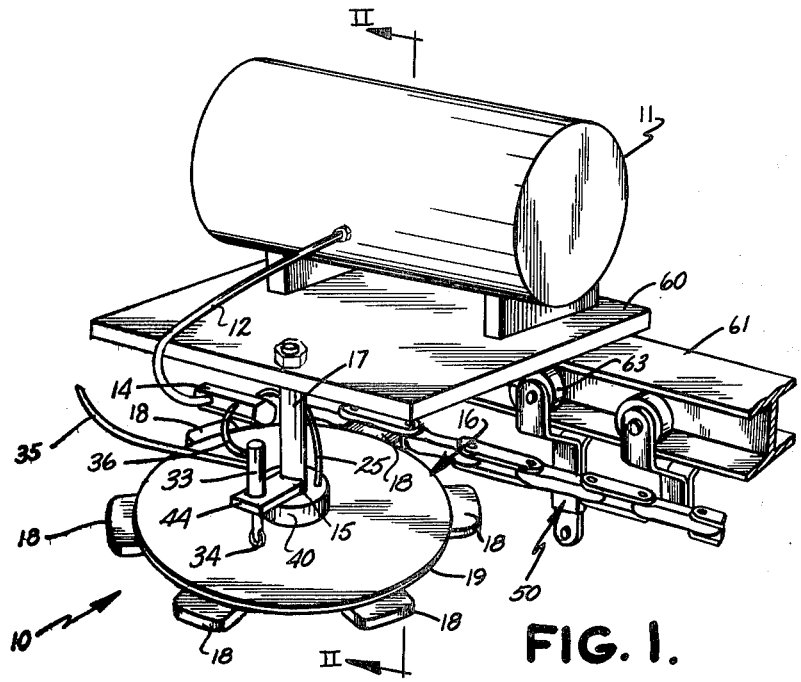
FIG. 1 is a front perspective view of a chain lubrication apparatus in accordance with an embodiment of this invention mounted for lubrication of an overhead conveyor chain.

Referring to FIGS. 1-5, a chain lubrication apparatus 10 includes an oil tank 11 which feeds oil through a line 12 to an air actuated metering valve 14. A sprocket wheel 16 is rotatably mounted on an elongated shaft 17 adjacent a chain 50 for directing the flow of lubricant from metering valve 14 to chain 50. Sprocket wheel 16 includes a generally circular, planar central hub or disc 19 with a central opening 15 for receiving shaft 17 and a plurality of lower teeth 18 secured to the underside of disc 19 and radially extending beyond the periphery of disc 19 for insertion between chain pins 51 of alternate links of a chain 50. Oil tank 11 is mounted on a support platform 60 secured to a support beam 61 for supporting chain 50 by means of trolley assemblies having wheels 63. Shaft 17 extends downward from platform 60 and is non-rotationally coupled to platform 60. Advantageously, oil tank 11 is mounted higher than sprocket wheel 16 so the oil can be gravity fed. Sprocket wheel 16 rotates as an idler sprocket powered by the chain and in a horizontal plane perpendicular to the direction of travel of chain 50 so six equally spaced teeth 18 sequentially proceed into and out of engagement with chain 50. Each tooth 18 has bores 28, 29, and 30 (FIG. 4) to act as lubricant passageways which receive lubricant from oil tank 11 and direct lubricant out of nozzles 31, secured within tooth 18, onto selected portions of chain 50. Activation of metering valve 14 causes oil to flow through only the one tooth 18 positioned within chain 50 to dispense lubricant.

Figure 3:
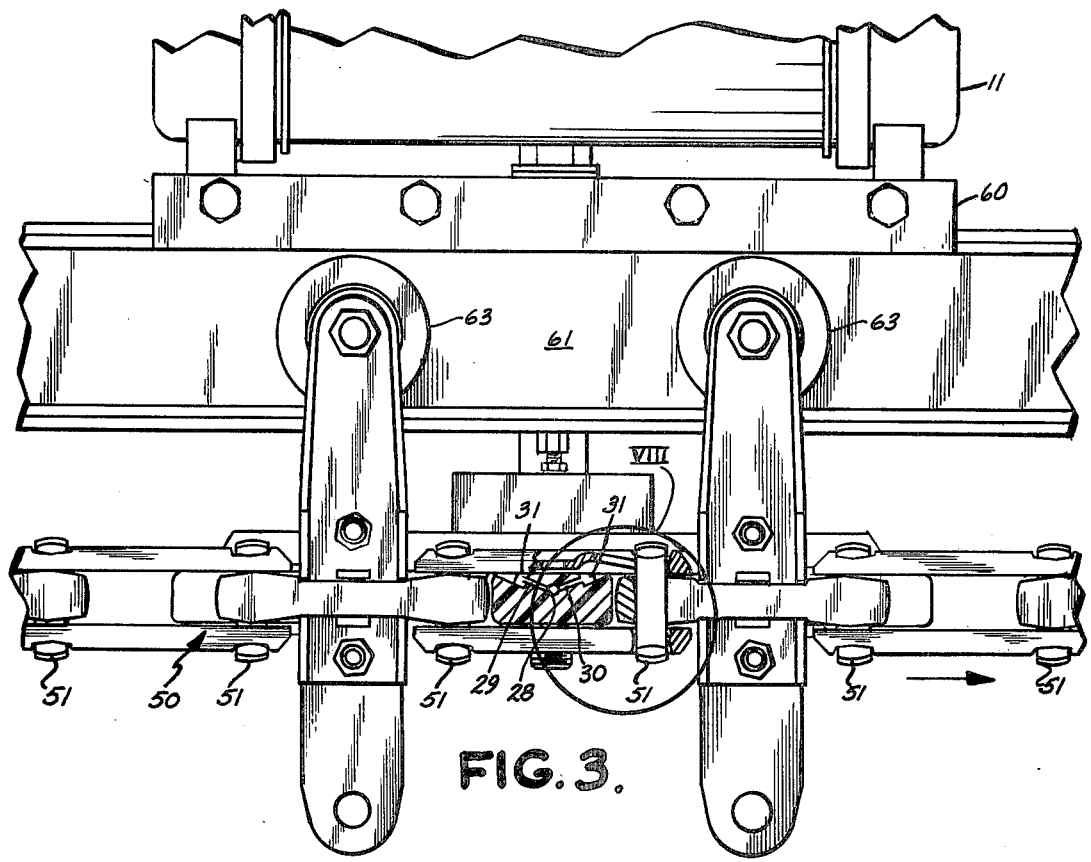
FIG. 3 is a side elevation view of the chain lubrication apparatus shown in FIG. 1 including a partial cross section view of a tooth engaged by the chain and one of the links engaged by the chain.
Figure 8:
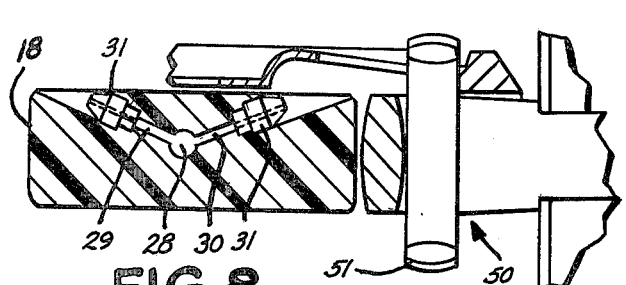
FIG. 8 is an enlarged view of a portion of FIG. 7 including a partial cross section view of a tooth engaged by the chain and one of the links engaged by the chain.
Figure 4:
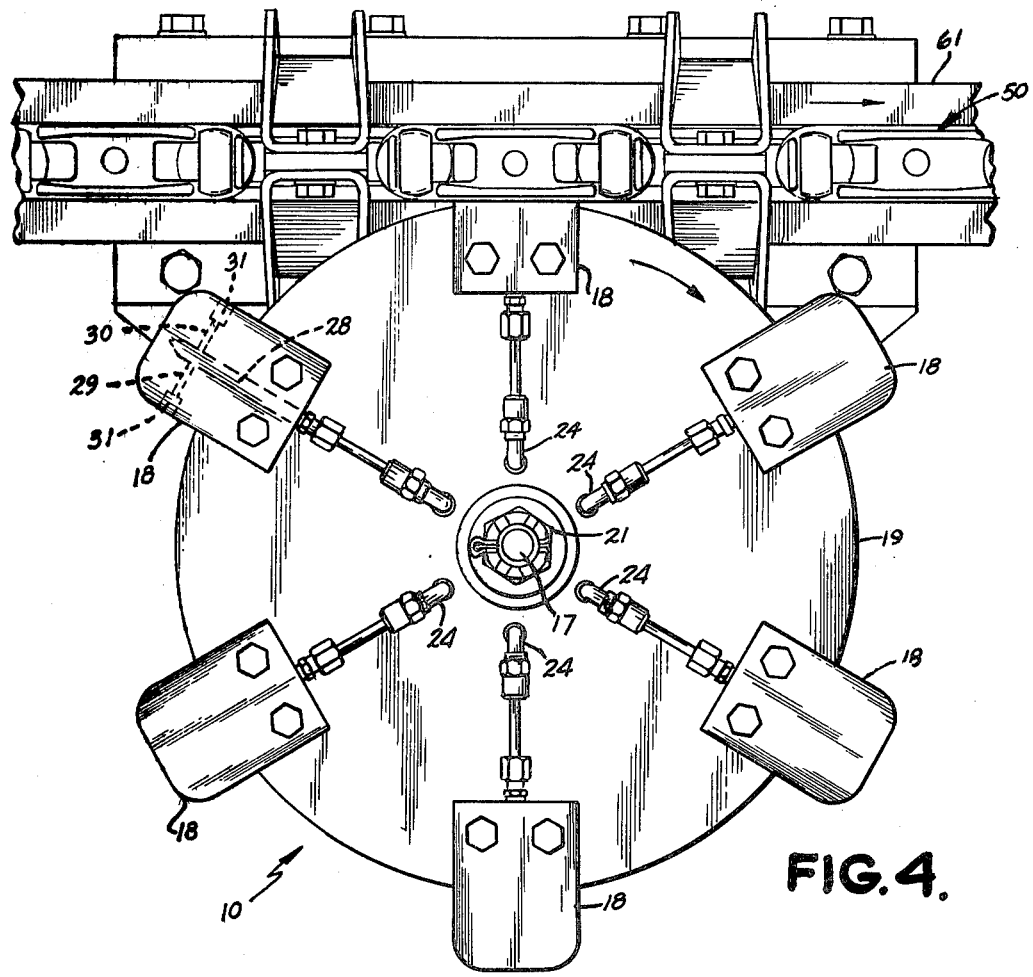
FIG. 4 shows a bottom plan view of a chain lubrication apparatus in accordance with an embodiment of this invention.

Sprocket wheel 16 further includes a conduit 24 associated with each tooth 18. Each conduit 24 extends through disc 19 parallel to the central axis of disc 19 and then radially outward to bore 28, which extends parallel to the longitudinal axis of tooth 18 from conduit 24 into tooth 18. Bore 30 extends from bore 28 upward and to the right, as shown in FIG. 3, to the outside of tooth 18. Similarly, bore 29 extends from bore 28 upward and to the left, as shown in FIG. 3, to the outside of tooth 18, and is generally symmetric with respect to the bore 30 about bore 28. Small, separately inserted nozzles 31 are positioned at the outer extremities of bores 29 and 30 and are flush with the tooth surface. Nozzles 31 each have a longitudinal central opening with a smaller cross section than that of bores 29 and 30 to increase the pressure and velocity or rate of flow of the lubricant coming out of nozzles 31 thereby shooting the lubricant toward friction wear areas such as pins 51 (See FIG. 8).

Shaft 17 has a shoulder 17a with a sufficiently large circumference to prevent a bearing unit 20 positioned around shaft 17 and mounted within central opening 15 from slipping further up shaft 17. Bearing 20 allows rotation of wheel 16 about shaft 17. Shaft 17 has a threaded end portion below shoulder 17a for receiving a nut 21 and a plurality of biasing spring washers 23 positioned intermediate nut 21 and bearing unit 20. Thus sprocket wheel 16 is mounted between shoulder 17a and biasing springs 23. Springs 23 can be four washers having a frusto conical shape arranged in alternate inverted order.

Figure 2:
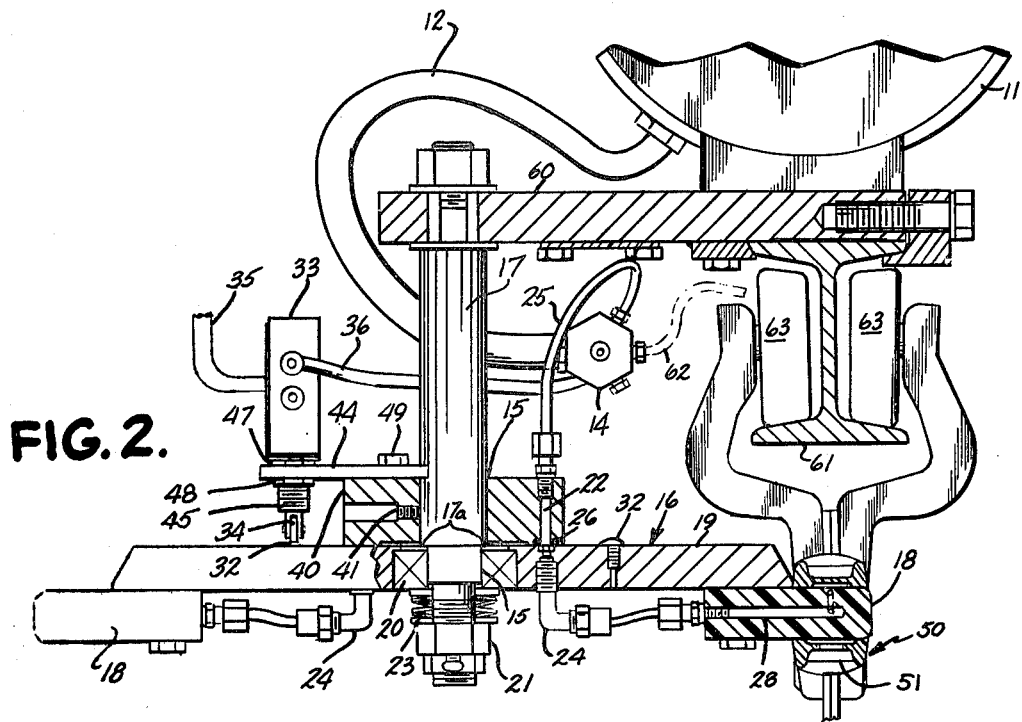
FIG. 2 is a partial cross section view taken substantially along section line II—II of FIG. 1 showing the engagement of the tooth with the chain and the lubricant passageway in the tooth.

Referring to FIGS. 1 and 2, an annular collar 40 is non-rotationally mounted on shaft 17 above sprocket wheel 16 and secured to shaft 17 by a screw 41 extending radially in collar 40. Collar 40 has a bore 22 extending parallel to and radially displaced from the longitudinal axis of shaft 17. Bore 22 is connected to metering valve 14 by a conduit 25 and is sequentially associated with each tooth 18. Bore 22 is circumferentially located so when a tooth 18 is positioned for lubricating chain 50, the conduit 24 associated with the positioned tooth 18 is aligned with bore 22 and oil can flow from oil tank 11 to tooth 18 through line 12, conduit 25, bore 22 and conduit 24. An O-ring 26 seals the point of communication between the aligned conduit 24 and bore 22. Spring washers 23 bias hub 19 upwardly to maintain sealing pressure between O-ring 26 and hub 19.

Aligned 180° from each tooth 18 on the upper surface of disc 19 is a button head screw 32 for actuating an air switch 33 by upward deflection of a roller 34. Air switch 33 is coupled between an air inlet tube 35 coupled to a compressed air source and an air outlet tube 36 coupled to a control input of metering valve 14. Air switch 33 couples tubes 35 and 36 in fluid communication when roller 34 is actuated by one of screws 32 thereby permitting a flow of air, and isolates tube 35 from tube 36 when roller 34 rests against the upper surface of disc 19. As a result, when a screw 32 actuates air switch 33, bore 22 is lined up with the associated conduit 24, the associated tooth 18 is positioned in chain 50 between adjacent chain pins 51, and metering valve 14 is actuated by air passing through air switch 33 to permit passage of a predetermined quantity of oil to lubricate chain 50.

Figure 5:
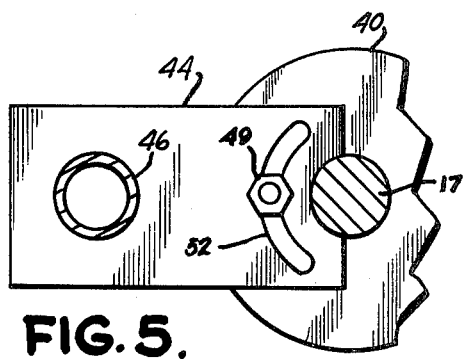
FIG. 5 is a top plan view of an adjustment means for a switch synchronizing the flow of lubricant with the position of the tooth in the chain in accordance with an embodiment of this invention.

To accommodate slight manufacturing variations and to permit initiation of oil flow from tank 11 just prior to engagement of tooth 18 in chain 50, air switch 33 is mounted on a rotatable adjustment plate 44. As shown in FIGS. 2 and 5, adjustment plate 44 has a generally rectangular shape with a semi-circular cutout at one end to closely abut the outer surface of shaft 17. Air switch 33 has a downwardly extending threaded shaft 45 which extends through an opening 46 in plate 44 and is secured to plate 44 by nuts 47 and 48 coupled to threaded shaft 45 above and below adjustment plate 44. Adjustment plate 44 is mounted on collar 40 by a bolt 49 passing through an arcuate opening 52 in plate 44. The arc of opening 52 has the same center of curvature as does the exterior of shaft 17. Accordingly, air switch 33 can be pivoted about shaft 17 to move air switch 33 ahead of the position directly opposite full tooth engagement in chain 50. Thus, air switch 33 can open metering valve 14 slightly ahead of full tooth engagement to give the lubricant time to fill any voids between metering valve 14 and the exit of lubricant from tooth 18.

The oil output of measuring valve 14 can also pass through a conduit 62 (FIG. 2) which is placed adjacent to chain supporting wheels 63 resting on support beam 61 and lubricates the axis of supporting wheels 63. If desired, the triggering for initiating oil flow through conduit 62 can be separate from screw 32.

Typically, chain lubrication apparatus 10 is an idler and neither drives nor supports chain 50. Having chain 50 drive lubrication apparatus 10 greatly reduces the wear on lubrication apparatus 10 in comparison to the wear on lubrication apparatus 10 were it to drive chain 50. However, lubrication apparatus 10 can be used as an idler to change the chain direction if the support components such as shaft 17 and sprocket wheel 16 were made of a sufficiently strong material or reinforced. Thus, chain lubrication apparatus 10 can be used either on a rectilinear chain section or a curvilinear chain section. Chain lubrication apparatus 10 can be positioned as a unit anywhere along chain 50 where an air supply is available.

Teeth 18 can be separately molded from disc 19 and can be used in conjunction with discs of different diameters. Although tooth 18 is preferably molded plastic with integrally formed bores, it could be cast of bronze, iron or other metals and have the bores formed after casting. Disc 19 can be fabricated by means analogous to those used to fabricate teeth 18. A typical material for collar 40 is bronze. In general, the structural members and valves can be fabricated of such materials as steel, stainless steel, bronze, plastic, etc. An example of metering valve 14 is a "Multi-Luber", Product number 82486 Series B, manufactured by Lincoln St. Louis Division of McNeil Corporation, St. Louis, Mo.

Figure 6:
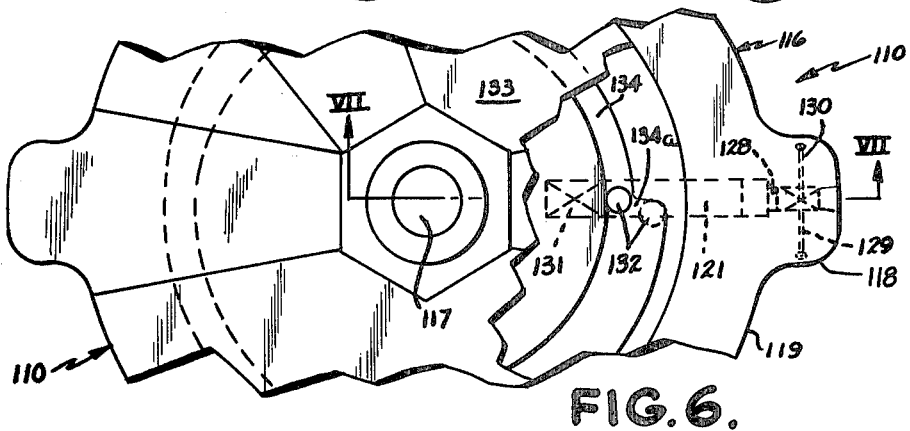
FIG. 6 is a top plan view, partially broken away, of a lubricating sprocket wheel using a mechanically perated actuator in accordance with a second embodiment of this invention.
Figure 7:
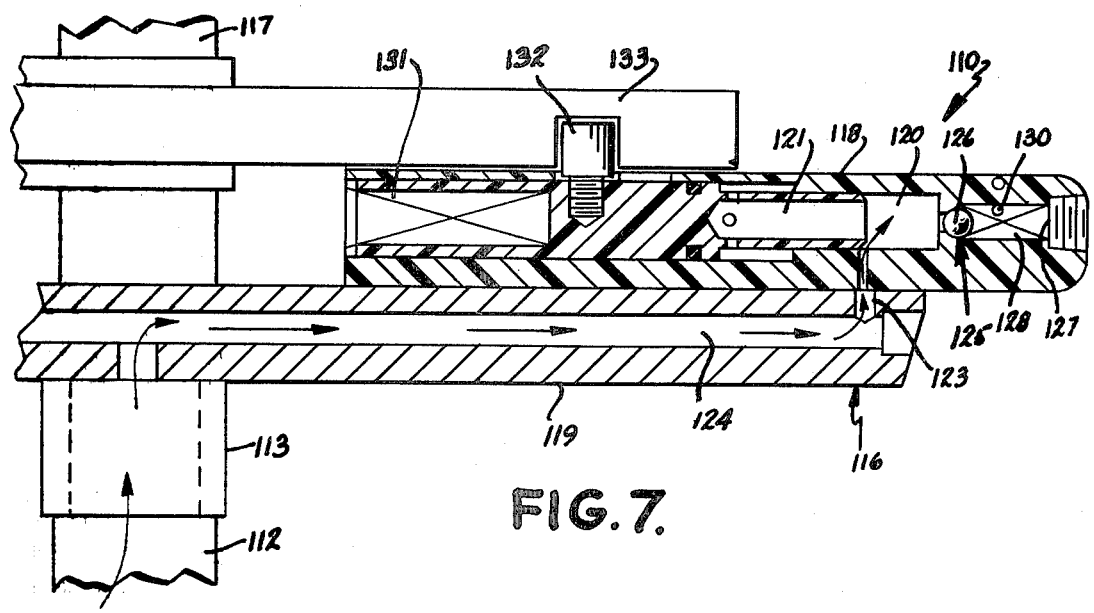
FIG. 7 is a side elevation and partial cross section view of a tooth and actuator taken generally along section line VII—VII of FIG. 6.

Referring to FIGS. 6 and 7, a second embodiment of this invention is a chain lubrication apparatus 110 which includes a rotating sprocket wheel 116 which rotates about a shaft 117. Generally, in contrast to the previous embodiment, mechanical actuation of a piston forces oil through internal lubricant conduits in a tooth when the tooth is positioned within the chain. Sprocket wheel 116 includes a disc 119 with a plurality of teeth 118 radially mounted on the upper surface of disc 19. Each tooth 118 has a longitudinal bore 128 connecting to transverse upwardly extending bores 129 and 130. Bores 129 and 130 extend in opposite directions so they open at the surfaces of tooth 118 adjacent opposite sides.

Oil flows from a reservoir (such as oil tank 11 of the previous embodiment) through an oil tube 112 to a rotating union 113 at the connection between shaft 117 and disc 119. Rotating union 113 is coupled to internal conduits 124 within disc 119 which are elongated lubricant passageways and extend radially from rotating union 113 toward each tooth 118. Each tooth 118 contains an elongated lubricant storage cylinder 120 connected to conduit 124 by a conduit 123. Cylinder 120 extends radially within tooth 118 and contains a spring loaded piston 121 longitudinally movable within cylinder 120. A spring 131 normally biases piston 121 radially outward so piston 121 seals the connection of conduit 123 into cylinder 120 when allowed to move toward passageways 129, 130. When spring 131 is compressed, piston 121 is positioned radially inward and lubricant can pass from conduit 123 into cylinder 120.

Communication between bore 128 and cylinder 120 is controlled by a check valve 125 including a ball 126 and a spring 127. Spring 127 normally biases ball 126 toward cylinder 120 and seals bore 128 from cylinder 120. Outward radial movement of cylinder 120 under the force of spring 131 builds up lubricant pressure unseating ball 126, allowing the lubricant to flow into bore 128 and then into bores 129 and 130. A force to retract piston 121 against spring 131 in each tooth is coupled by a cam follower 132 attached to piston 121 in each tooth by such means as screwing into a threaded opening. Cam follower 132 extends upward from piston 121 and is movable along a radial slot in tooth 118.

A cam 133 is non-rotationally mounted to shaft 117 above sprocket wheel 116 and includes a generally spiral groove 134 opening downward and sized to receive cam follower 132. As can be seen from FIG. 6, spiral groove 134 includes a generally radial portion 134a which essentially connects two radially aligned portions of spiral groove 134. As sprocket wheel 119 is rotated so cam follower 132 is guided in a radially inward spiral, spring 131 biases cam follower 132 radially outward against the outward wall of spiral groove 134. When cam follower 132 reaches radial portion 134a of groove 134, cam follower 132 moves radially outward under the influence of spring 131 and also causes piston 121 to move radially outward within cylinder 120 thus closing conduit 123 to prevent oil from escaping and unseating ball 126 thus opening check valve 125 and causing oil to flow through bores 129 and 130. FIG. 6 shows cam follower 132 just before and just after radial movement. Radial portion 134a is circumferentially aligned so that when a cam follower 132 moves radially outward, a tooth 118 associated with the moving cam follower 132 is positioned within chain 50 so lubricant flowing through bores 129 and 130 is deposited on a friction wear area of chain 50.

OPERATION

Mounting chain lubrication apparatus 10, filling oil reservoir 11 and coupling an air source to air switch 33 prepares chain lubrication apparatus 10 for operation. Movement of chain 50 causes teeth 18 to engage opening in chain 50 between adjacent chain pins 51 and turns sprocket wheel 16. When a tooth 18 is positioned within the chain so internal bores 29 and 30 are adjacent chain pins 51, screw 32 raises roller 34 to actuate switch 33 which in turn actuates metering valve 14 to pass a predetermined amount of oil. Initially, a few turns of sprocket wheel 16 may be necessary to fill with oil the volume within line 12, conduit 25, bore 22, conduit 24 and bores 28, 29, and 30. Subsequently, any oil flow through metering valve 14 causes pressurization of oil within the path of the oil and a rapid flow of oil out of nozzles 31. Typically, a very small amount of oil is used so that oil flow will cease before tooth 18 comes out of engagement with chain 50. As chain 50 continues to move, another tooth 18 is brought into engagement with chain 50 and dispenses oil when the button head screw 32 associated with that tooth is in position to actuate air switch 33.

Chain lubrication apparatus 110 is also driven by chain 50. However, each tooth 118 has associated cam follower 132 which travels in a common groove 134. Thus, as chain 50 brings successive teeth 118 into engagement with the chain, a cam follower 132 on each tooth reaches radial portion 134a of spiral groove 134 and travels radially outward because of the driving force of spring 131. The amount of oil emitted from bores 129 and 130 is equal to the amount of volume within cylinder 120 displaced by piston 121. As a result, in both embodiments, a predetermined amount of lubricant is accurately placed at a friction wear point in the chain and over lubrication is avoided even if the chain stops.

Various modifications and variations will no doubt occur to those skilled in the various arts to which this invention pertains. For example, the first described embodiment uses a single metering valve. It can, of course, be appreciated that a metering valve can be associated with each tooth and connected to a common source of oil. Analogously, although individual pistons are associated with each tooth in the second embodiment, it can be appreciated that a single piston can be selectively and sequentially associated with each tooth as it comes into engagement with the chain and cause a flow of oil. Further, it can be appreciated that means other than those described can be used for indicating engagement of the tooth with the chain and for initiating flow of the lubricating fluid. These and all other variations which basically rely on the teachings through which this disclosure has advanced the art are properly considered within the scope of this invention as defined by the appended claims.

The embodiments of the invention in which an exclusive property or privilege is claimed are defined as follows.

1. A tooth for use in a chain lubrication apparatus and adapted to engage a chain of the type having pins joining links therein and for efficiently supplying lubricant to such chain, said tooth having a front, top, bottom and opposing sides and being sized to be receivable within separate links of such a chain between adjacent chain pins such that when the tooth is received in such a link, a portion of the link will be adjacent the top and bottom of said tooth, and a chain pin will be adjacent each side of said tooth, said tooth including means for attachment to a carrier for moving said tooth into and out of engagement with the chain, and an internal lubricant passageway for passing lubricant through said tooth; at least one portion of said lubricant passageway extending to an opening adjacent one of said opposing sides such that lubricant will be directed therefrom toward one of the chain pins when said tooth is received in the chain.

2. A tooth as recited in claim 1 including at least one nozzle positioned in said passageway portion no higher than flush with said surface of said tooth, said nozzle having an opening for dispensing lubricant supplied to said tooth and passing through said internal lubricant passageway.

3. A tooth as recited in claim 2 wherein said portion of internal lubricant passageway includes at least one transverse passage extending toward one side of said tooth, said transverse passage adapted for carrying lubricant at least a portion of the way through said tooth to said nozzle.

4. A tooth as recited in claim 3 wherein said means for attachment include means for supporting said tooth on a carrier with its bottom generally horizontal when engaged with a chain; said transverse passage being inclined generally upwardly and away from said tooth bottom as said transverse passage approaches the surface of said tooth.

5. A tooth as recited in claim 4 wherein said transverse passage has a larger cross-sectional area than said opening of said nozzle for increasing the pressure and velocity of the lubricant through said nozzle in comparison to the pressure and velocity through said transverse passage.

6. A chain lubrication apparatus including at least one tooth for engaging a chain of the type including pins joining links therein and supplying a lubricate to the chain, means for moving said tooth in a predetermined plane for temporary engagement with links of said chain between said pins, said tooth adapted to be received between an adjacent pair of chain pins coupling the links of a chain such that the pins extend generally transverse to said plane of movement of said tooth and adjacent said tooth, said tooth including an internal lubricant passageway having a final portion opening at a surface of said tooth which is adapted to be immediately adjacent at least one of the chain pins when said tooth is received between an adjacent pair of chain pins, said final passageway portion being located in said tooth and directed toward said pin location so lubricant flowing in said passageway will be deposited on at least one of the chain pins adjacent one end of the pin to allow subsequent flow along the chain pin under the influence of gravity to lubricant other portions of the chain pin.

7. A chain lubrication apparatus as recited in claim 6 wherein said final passageway portion is generally inclined at an angle to said plane of movement of said tooth as said final passageway portion approaches the surface of said tooth.

8. A chain lubrication apparatus as recited in claim 7 wherein said tooth has a longitudinal axis in the direction of protrusion of said tooth, and said final passageway portion is transverse to the longitudinal axis of said tooth.

9. A chain lubrication apparatus as recited in claim 6 wherein said tooth includes a base, left and right exterior surfaces and longitudinal axis, said lubricant passageway including:

a central portion extending generally parallel to said longitudinal axis of said tooth for carrying the lubricant from the base of said tooth into said tooth;

a left transverse portion connecting said central portion to said left exterior surface of said tooth, said left transverse portion extending generally at an angle to said plane of movement of said tooth and transversely from said central portion; and a right transverse portion connecting said central portion to said right exterior surface of said tooth, said right transverse portion extending generally at an angle to said plane of movement of said tooth and transversely from said central portion.

10. A chain lubrication apparatus as recited in claim 9 further comprising:

a first nozzle adjacent the outside extremity of said left transverse portion, said first nozzle having a restricted first central opening for passing lubricant from said left transverse portion, said first central opening having a smaller cross section than said left transverse portion thereby increasing the pressure and velocity of the lubricant; and a second nozzle adjacent the outside extremity of said right transverse portion, said second nozzle having a restricted second central opening for passing lubricant from said right transverse portion, said second central opening having a smaller cross section than said right transverse portion thereby increasing the pressure and velocity of the lubricant.

11. A chain lubrication apparatus as recited in claim 10 wherein said means for moving said tooth include a central hub for mounting a plurality of said teeth, said teeth being radially positioned beyond the perimeter of said central hub and equally spaced around said central hub, said hub being rotationally movable for movement of said teeth into and out of engagement with the chain.

12. A chain lubrication apparatus as recited in claim 11 further comprising:

means for passing a measured amount of lubricant through said lubricant passageway.

13. A chain lubrication apparatus comprising:

a sprocket for engaging a chain, said sprocket rotationally mounted and including a plurality of elongated radially extending teeth for engaging the chain between adjacent chain pins of the chain; each tooth of said teeth having a generally rectangular cross section and an internal lubricant passageway;

said lubricant passageway having an longitudinal central portion connected to a left transverse portion and a right transverse portion, said central portion generally positioned between the sides of said tooth, said left transverse portion extending from said central portion upwardly and outwardly to exit to the outside of said tooth adjacent the corner between the top and the left side of said tooth, said right transverse portion extending from said central portion upwardly and outwardly to exit to the outside of said tooth adjacent the corner between the top and the right side of said tooth; said left and right transverse portions positioned along the lenght of said tooth so the exit points of said left and right portions are positioned adjacent the chain pins when said tooth is engaging the chain;

a first nozzle adjacent the outside extremity of said left transverse portion, said first nozzle having a restricted first central opening for passing lubricant from said left transverse portion, said first central opening having a smaller cross section than said left transverse portion thereby increasing the pressure and velocity of the lubricant; and a second nozzle adjacent the outside extremity of said right transverse portion, said second nozzle having a restricted second central opening for passing lubricant, said second central opening having a smaller cross section than said right transverse portion thereby increasing the pressure and velocity of the lubricant; and means for passing a measured amount of lubricant through said lubricant passageway, said means for passing connected to said lubricant passageway.

14. A chain lubrication apparatus as recited in claim 13 wherein said tooth with said lubricant passageway is molded of a plastic material.

15. A chain lubrication apparatus comprising:

a lubricant reservoir for storing a lubricant for use in repeated lubrications of a chain of the type having links connected by pins;

tooth means adapted for insertion between adjacent pins of such a chain for dispensing the lubricant to the chain pins from within the chain when the tooth means is inserted in the chain, said tooth means having a lubricant passageway therethrough which is coupled to receive lubricant from said lubricant reservoir, said lubricant passageway having a final portion directed and opening toward a location adjacent the tooth means for directing lubricant to one of the pins when the tooth means is inserted within the chain;

a metering means for measuring a predetermined amount of lubricant to be used for one lubrication, said metering means coupled in the path of flow of the lubricant from said lubricant reservoir to said tooth means; and actuating means for triggering lubricant flow through said passageway of said tooth means when said tooth means is engaging and inserted within the chain.

16. A lubricant reservoir for storing a lubricant for use in repeated lubrications of a chain;

tooth means for engaging the chain and dispensing the lubricant, said tooth means coupled to receive lubricant from said lubricant reservoir;

a metering means for measuring a predetermined amount of lubricant to be used for one lubrication, said metering means coupled in the path of flow of the lubricant from said lubricant reservoir to said tooth means; and actuating means for triggering lubricant flow through said tooth means when said tooth means is engaging the chain;

said metering means including at least one air actuated metering valve for passing a predetermined amount of lubricant;

said tooth means including a rotatable sprocket wheel having a plurality of radially extending lubricating teeth, each of said lubricating teeth having an internal lubricant passageway; and said actuating means including an indexing point on said sprocket wheel positioned with respect to at least one of said lubricating teeth, to indicate when said one lubricating tooth is engaging the chain and in registry with a lubrication position wherein lubricant can be applied to a friction wear area of the chain, and an air switch valve responsive to the position of said indexing point and coupled to said metering means for triggering flow of said predetermined amount of lubricant to said one lubricating tooth.

17. A chain lubrication apparatus as recited in claim 16 wherein:

said metering valve is selectively connected to said internal lubricant passageway of said one lubricating tooth of said sprocket wheel when said one lubricating tooth is in the lubrication position and between adjacent chain pins of the chain;

said actuating means including a plurality of said indexing points, each of said indexing points having button means protruding from said sprocket and associated in a known, fixed relationship to one of said teeth; and said air switch valve positioned to be actuated by the one of said button means associated with said one lubricating tooth to actuate said metering valve and the flow of said predetermined amount of lubricant through said lubricating tooth to the chain.

18. A chain lubrication apparatus as recited in claim 17 wherein said lubricant passageway includes a transverse portion extending in a generally transverse direction with respect to the longitudinal axis of said tooth, said passageway being generally inclined upwardly as said passageway approaches the surface of said tooth so lubricant flowing in said passageway is deposited at an upper portion of the chain pin and can flow down the chain pin under the influence of gravity to lubricate the lower portions of the chain pin.

19. A chain lubrication apparatus comprising:

a lubricant reservoir for storing a lubricant for use in repeated lubrications of a chain;

tooth means for engaging the chain and dispensing the lubricant, said tooth means coupled to receive lubricant from said lubricant reservoir;

a metering means for measuring a predetermined amount of lubricant to be used for one lubrication, said metering means coupled in the path of flow of the lubricant from said lubricant reservoir to said tooth means; and actuating means for triggering lubricant flow through said tooth means when said tooth means is engaging the chain;

said metering means including a lubricant cylinder of a predetermined size, said lubricant cylinder being coupled to receive lubricant from said lubricant reservoir and to dispense lubricant through said lubricant passageway of said tooth means, and a pump means for expelling a predetermined amount of lubricant from said lubricant cylinder;

said tooth means including a rotatable sprocket wheel having a plurality of radially extending teeth, each of said teeth having an internal lubricant passageway; and said actuating means including a follower coupled to said pump means, said follower positionable in an activation position for initiating activation of said pump means to expel lubricant from said lubricant cylinder, and a guide means for positioning said follower in said activation position.

20. A chain lubrication apparatus as recited in claim 19 wherein:

one of each of said lubricating cylinder, pump means and follower are associated with each one of said radially extending teeth; and said guide means is coupled to position all of said followers in positions approaching said activation position and to position a follower, associated with a lubricating tooth engaging the chain, in said activation position thereby initiating flow of lubricant from said lubricating tooth, said lubricating tooth being one of said teeth in registry with a lubrication position wherein lubricant can be applied to a friction wear area of the chain.

21. A chain lubrication apparatus as recited in claim 20 wherein:

said guide means is a spiral slot having a connecting radial portion at the circumferential position of the follower associated with said lubricating tooth;

said pump means includes a spring biased piston for expelling lubricant from said lubricating cylinder, the spring biasing being in a direction to cause lubricant flow toward said lubricant passageway of said lubricating tooth; and said follower includes a protrusion received in said spiral slot and coupled to said piston, said protrusion causing movement of said piston to expel lubricant from said lubricating tooth when moving along said radial portion.

22. A chain lubrication apparatus as recited in claim 21 wherein said lubricant passageway includes a transverse portion extending in a generally transverse direction with respect to the longitudinal axis of said tooth, said passageway being generally inclined upwardly as said passageway approaches the surface of said tooth so lubricant flowing in said passageway is deposited at an upper portion of the chain pin and can flow down the chain pin under the influence of gravity to lubricate the lower portions of the chain pin.

23. A chain lubrication apparatus comprising:

a lubricant reservoir for storing a lubricant for use in repeated lubrications of a chain and the chain pins of a chain;

tooth means for engaging the chain and dispensing the lubricant, said tooth means including a rotatable sprocket wheel having a plurality of radially extending teeth, each of said teeth having an internal lubricant passageway;

said lubricant passageway including a central portion extending generally parallel to the longitudinal axis of said tooth for carrying the lubricant from the base of said tooth into said tooth; a left transverse portion connecting said central portion to the left exterior of said tooth, said left transverse portion extending generally upwardly and transversely from said central portion; and a right transverse portion connecting said central portion to the right exterior of said tooth, said right transverse portion extending generally upwardly and transversely from said central portion, whereby lubricant flowing in said passageway is deposited at an upper portion of the chain pin and can flow down the chain pin under the influence of gravity to lubricate the lower portions of the chain pin;

a first nozzle adjacent the outside extremity of said left transverse portion, said first nozzle having a restricted first central opening for passing lubricant, said first central opening having a smaller cross section than said left transverse portion thereby increasing the pressure and velocity of the lubricant;

a second nozzle adjacent the outside extremity of said right transverse portion, said second nozzle having a restricted second central opening for passing lubricant, said second central opening having a smaller cross section than said right transverse portion thereby increasing the pressure and velocity of the lubricant;

a metering means for measuring a predetermined amount of lubricant to be used for one lubrication, said metering means coupled in the path of flow of the lubricant from said lubricant reservoir to said internal lubricant passageway; and actuating means for triggering lubricant flow through said tooth means when said tooth means is engaging the chain.

24. A chain lubrication apparatus as recited in claim 23 wherein:

said metering means includes a plurality of lubricant cylinders of a predetermined size, one of said lubricant cylinders being associated with each of said teeth, each of said lubricant cylinders being coupled to receive lubricant from said lubricant reservoir and to dispense lubricant through the associated tooth, and a pump means for expelling a predetermined amount of lubricant from said lubricant cylinder, said pump means including a plurality of spring biased pistons, one of said pistons being associated with each of said cylinders, each of said pistons being movable for expelling lubricant from the associated lubricating cylinder, the spring biasing being in a direction to cause lubricant flow toward said internal passageway of the associated tooth; and said actuating means includes a plurality of followers, one of said followers being coupled to each of said pistons, said followers positionable in an activation position for initiating activation of said pistons to expel lubricant from said lubricant cylinder, and a guide means for positioning said followers in said activation positions, said guide means including a spiral slot having a radial portion at a circumferential position wherein one of said followers is in said activation position and a lubricating tooth associated with said one follower is in a lubrication position wherein said lubricating tooth is positioned between two adjacent chain pins; said followers each including a protrusion for causing movement of the associated piston expel lubricant from said lubricating tooth when said protrusion moves along said radial portion.

25. A chain lubrication apparatus as recited in claim 23 wherein:

said metering means includes one air actuated metering valve for passing a predetermined amount of lubricant, said metering valve being selectively connected to a lubricating tooth in registration with a lubrication position wherein a tooth is positioned between two adjacent chain pins;

said actuating means includes a plurality of indexing points on said sprocket wheel, one indexing point being associated with each of said teeth, said indexing point indicating when the associated tooth is in said lubrication position, an air switch valve responsive to the presence of said indexing point and coupled to said metering means for triggering said metering valve to pass said predetermined amount of lubricant; and said air switch valve is positioned to be actuated by the indexing point associated with said lubricating tooth to actuate said metering valve and flow of said predetermined amount of lubricant through said lubricating tooth in said lubrication position.

26. A method of lubricating a chain including the steps of:

inserting a tooth of a sprocket wheel in a lubrication position between two adjacent chain pins of the chain thereby registering said tooth with said lubrication position; and applying lubricant to the chain through an internal lubricant passageway in said tooth by directing lubricant through said passageway and outwardly to exit from said tooth, so lubricant flowing in said passageway is deposited at an upper portion of the chain pin and can flow down the chain pin under the influence of gravity to lubricate the lower portions of the chain pin.

27. A method of lubricating a chain as recited in claim 26 further comprising the step of increasing the pressure and velocity of the lubricant by directing said lubricant through a restricted passageway portion before it exits said tooth.

28. A method of lubricating a chain as recited in claim 27 further comprising:

measuring a predetermined amount of lubricant to be applied at one lubrication at a given registration of said tooth with said lubrication position.

29. A method of lubricating a chain including the steps of:

withdrawing lubricant from a reservoir of stored lubricant;

measuring a predetermined amount of lubricant to be used for one lubrication;

registering a tooth of a sprocket wheel with a lubrication position wherein said tooth is positioned in an opening between a pair of adjacent chain pins, and applying lubricant to the chain through an internal lubricating passageway in said tooth by directing lubricant with said passageway at the top of the chain pin so lubricant flowing in said passageway is deposited at an upper portion of the chain pin and can flow down the chain pin under the influence of gravity to lubricate the lower portions of the chain pin.

30. A method of lubricating a chain as recited in claim 29 wherein the step of measuring includes:

actuating a metering valve in the path of the lubricant between the reservoir and said tooth to pass a predetermined amount of lubricant.

31. A method of lubricating a chain as recited in claim 30 wherein the step of applying lubricant includes:

predetermining registration of said tooth with said lubrication position by the position of an indicating means on said sprocket wheel, said indicating means being associated solely with said tooth; and activating a switch valve by the position of said indicating means, said switch valve being coupled to and controlling actuation of said metering valve thereby measuring said predetermined amount of lubricant.

32. A method of lubricating a chain as recited in claim 29 wherein the step of measuring includes:

filling a cylinder of a predetermined size with lubricant, said cylinder being uniquely associated with said tooth.

33. A method of lubricating a chain as recited in claim 32 wherein the step of applying lubricant includes the steps of:

determining registration of said tooth with said lubricating position by the position of a follower within a guide means; and activating a piston, coupled to said follower and movable within said cylinder, to expel lubricant from said cylinder by movement of said follower within said guide means when said tooth is registered with said lubrication position.

34. A method of lubricating a chain as recited in claim 33 wherein the step of applying lubricant further includes the step of:

positioning said follower within a radial slot connecting radially adjacent portions of a spiral slot comprising said guide means, said radial slot being aligned with said follower when said tooth is registered with said lubrication position.

35. The combination of a tooth for use in lubricating a chain and a chain to be lubricated thereby comprising:

a chain having regularly spaced chain pins joining a plurality of links, at least portions of at least some of said links being spaced apart along pairs of said chain pins at intervals along said chain to form a series of tooth receiving areas, said chain adapted for use with said pins extending vertically and said spaced link portions aligned vertically with said tooth receiving areas opening horizontally to the chain exterior;

a tooth adapted for insertion in one of said tooth receiving areas of said chain such that said chain pins are received on opposite sides of said tooth, said tooth including means for attachment to a carrier for moving said tooth into and out of engagement with the chain and an internal lubricant passageway for passing lubricant through said tooth; at least one portion of said lubricant passageway opening at a surface of said tooth and being directed such that when said tooth is received in one of said tooth receiving areas of said chain and lubricant is moved through said passageway portion, the lubricant will be directed toward one of one of said chain pins whereby it can flow along that pin to high friction and wear areas of the pin.

* * * * *

UNITED STATES PATENT AND TRADEMARK OFFICE
CERTIFICATE OF CORRECTION

PATENT NO. : 4,159,046  
DATED : June 26, 1979  
INVENTOR(S) : Charles C. Frost, et al.

Page 1 of 2

It is certified that error appears in the above–identified patent and that said Letters Patent are hereby corrected as shown below:

Column 2, line 67:  
"perated" should be -- operated --

Column 5, line 29:  
"19" should be -- 119 --

Column 7, Claim 6, line 57:  
"lubricate" should be -- lubricant --

Column 8, Claim 6, line 6  
"lubricant" should be -- lubricate --

Column 9, Claim 13, line 14:  
"lenght" should be -- length --

UNITED STATES PATENT AND TRADEMARK OFFICE
CERTIFICATE OF CORRECTION

PATENT NO. : 4,159,046

DATED : June 26, 1979

INVENTOR(S) : Charles C. Frost, et al.

It is certified that error appears in the above-identified patent and that said Letters Patent are hereby corrected as shown below:

Column 9, Claim 16, line 62:
Before "A lubricant" insert -- A chain lubrication apparatus comprising: --

Column 9, Claim 16, line 62:
Delete "A" and substitute therefor -- a --

Column 12, Claim 24, line 66:
Before "expel" insert -- to --

Column 14, Claim 33, line 5:
"cating" should be -- cation --

Column 14, Claim 35, line 62:
Delete "one of"

Signed and Sealed this

Fourth Day of March 1980

[SEAL]

Attest:

SIDNEY A. DIAMOND

Attesting Officer

Commissioner of Patents and Trademarks